US009396744B1

(12) United States Patent
Yamashita et al.

(10) Patent No.: US 9,396,744 B1
(45) Date of Patent: Jul. 19, 2016

(54) TWO DIMENSIONAL MAGNETIC READ HEAD HAVING ASYMMETRICAL SECONDARY READ ELEMENTS (71) Applicant: HGST Netherlands B.V., Amsterdam (NL)

(72) Inventors: Masato Yamashita, Tokyo (JP); Hiroyuki Katada, Kanagawa (JP); Jun Aoyama, Kanagawa (JP); Masato Shiimoto, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/822,853

(22) Filed: Aug. 10, 2015

(51) Int. Cl.
G11B 5/39 (2006.01)
(52) U.S. Cl.
CPC ............ *G11B 5/3912* (2013.01); *G11B 5/3958* (2013.01)
(58) Field of Classification Search
CPC ... G11B 5/3912; G11B 5/3948; G11B 5/3958
USPC .................. 360/314, 315, 316, 319, 320, 121
See application file for complete search history.

(56) References Cited

U.S. PATENT DOCUMENTS

| 6,525,897 | B2 | 2/2003 | Despain et al. | |
|---|---|---|---|---|
| 7,126,890 | B2 | 10/2006 | Learned et al. | |
| 7,751,148 | B1* | 7/2010 | Alstrin | G11B 5/00826 360/121 |
| 8,310,782 | B2* | 11/2012 | Song | G11B 5/1278 360/121 |
| 8,638,513 | B1 | 1/2014 | Burd | |
| 8,711,517 | B2 | 4/2014 | Erden et al. | |
| 8,724,252 | B2 | 5/2014 | Gao et al. | |
| 2006/0028772 | A1* | 2/2006 | Raastad | G11B 5/3903 360/315 |
| 2013/0286502 | A1* | 10/2013 | Erden | G11B 5/5552 360/76 |
| 2014/0063644 | A1* | 3/2014 | Lou | G11B 5/4886 360/75 |
| 2014/0160590 | A1 | 6/2014 | Sankaranarayanan et al. | |
| 2015/0170678 | A1* | 6/2015 | Mastain | G11B 5/11 360/128 |
| 2015/0221329 | A1* | 8/2015 | Mashima | G11B 5/3929 360/315 |
| 2015/0248900 | A1* | 9/2015 | Batra | G11B 20/10009 360/45 |

FOREIGN PATENT DOCUMENTS

WO 2010062300 A2 6/2010

OTHER PUBLICATIONS

Lucchesi, R., "Two dimensional magnetic recording (TDMR)," RayOnStorageBlog, blog posting, retrieved from http://silvertonconsulting.com/blog/2014/03/05/two-dimensional-magnetic-recording-tdmr/#sthash.lqisKWIZ.dpbs, Mar. 5, 2014, pp. 1-3.

* cited by examiner

*Primary Examiner* — Jefferson Evans
(74) *Attorney, Agent, or Firm* — Zilka-Kotab, PC (57) ABSTRACT

A magnetic read head configured for two dimensional magnetic recording and having asymmetrical secondary read elements. The magnetic read head includes a primary read element configured to read a data track (i.e. n data track) and first and second secondary read elements located over adjacent data tracks (i.e. n+1, n-1 data track) at either side of the data track to be read. The secondary read element have asymmetrical off track amplitude profiles, preferably such that they each have a steep amplitude profile at the outer side and a broader cross-track amplitude profile at their inner sides. This allows the secondary read elements to detect signals of the adjacent data track (so that those signals can be subtracted out of the signal from the primary reader) without the secondary read elements also picking up further adjacent data tracks (i.e. n+2, n-2).

17 Claims, 9 Drawing Sheets

TWO DIMENSIONAL MAGNETIC READ HEAD HAVING ASYMMETRICAL SECONDARY READ ELEMENTS

FIELD OF THE INVENTION

The present invention relates to magnetic data recording and more particularly to a magnetic read head having a primary read head and secondary read heads, wherein the secondary read heads have an asymmetrical cross-track amplitude profile.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

As the need for ever increased data density becomes ever higher the data tracks recorded onto a magnetic media become ever closer together. The demand for data density is reaching the point where the functional track width can be even smaller than the physical width of the read element. When this happens, signals from adjacent tracks provide a large amount of unwanted signal noise. Therefore, there remains a need for a magnetic recording system that can overcome this challenge, allowing the ability to read data tracks at very high track pitch, while still providing a useable data signal.

SUMMARY

The present invention provides a magnetic read head that includes a primary read element and a secondary read element. The secondary read element is configured such that it has an asymmetrical read profile.

The read head can be configured with a pair of secondary read elements arranged in laterally offset off-track locations relative to the primary read element and wherein each of the secondary read elements may have an asymmetrical cross track amplitude profile. The asymmetrical off-track amplitude profiles can be such that each read element has a steeper amplitude profile at its outer edge and a broader cross-track amplitude profile at its inner side.

Signals from the secondary read elements can be subtracted out from the signal from the primary read element so as to eliminate signal noise resulting from the adjacent track interference picked up by the primary read element. The asymmetrical off-track amplitude profile allows the secondary read sensors to pick up a desired signal of the adjacent track without also picking up a signal from a further adjacent track. As a result, the final processed signal is more accurate, with less signal noise.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
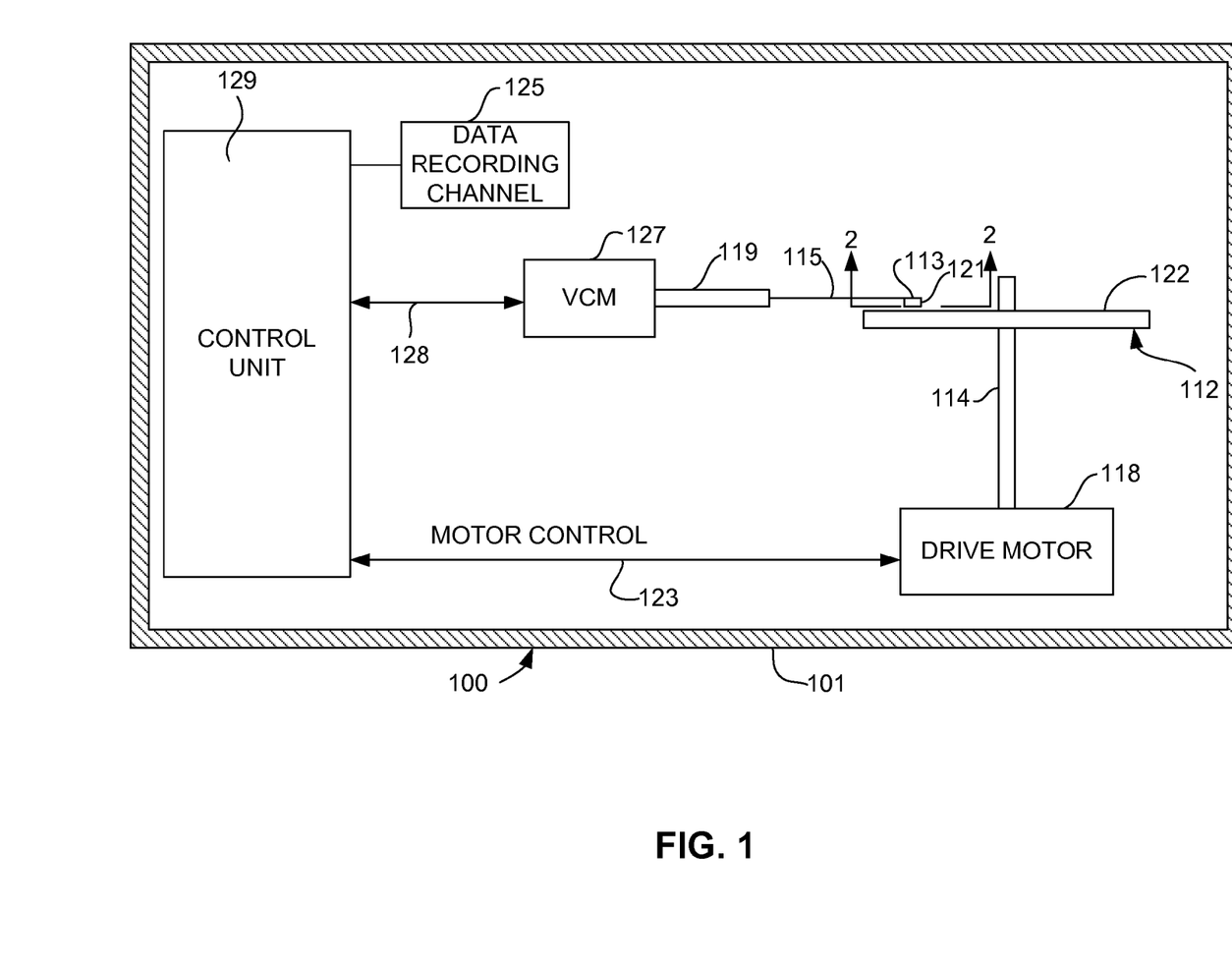
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
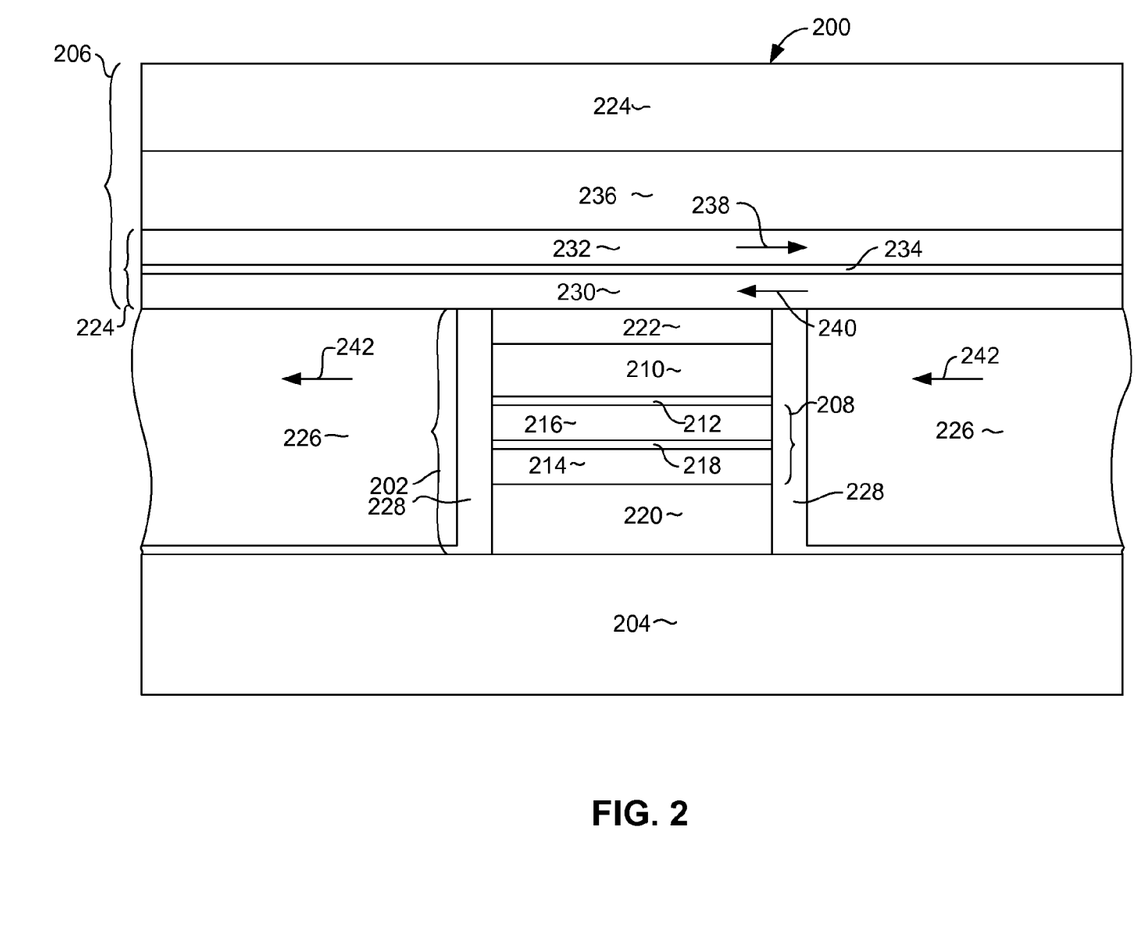
FIG. 2 is a schematic view of an example of a magnetic sensor element as seen from a media facing surface.

FIG. 2 shows an example of a magnetoresistive sensor 200 that might be used to detect a magnetic signal such as from a magnetic media. This is by way of example only, however, as various other magnetic sensor designs could be used to the same effect. The sensor 200 can include a sensor stack 202 sandwiched between a lower shield 204 and an upper shield 206.

The sensor stack 202 can include a magnetic pinned layer structure 208, a magnetic free layer structure 210 and a non-magnetic barrier or spacer layer 212 sandwiched between the pinned layer structure 208 and magnetic free layer structure 210. If the sensor 200 is a giant magnetoresistive sensor (GMR) then the non-magnetic layer 212 can be an electrically conductive spacer layer such as Cu. On the other hand, if the sensor 200 is a tunnel junction magnetoresistive sensor (TMR), then the layer 210 can be a thin, non-magnetic, electrically insulating barrier layer.

The pinned layer 208 can be an anti-parallel coupled structure that includes first and second magnetic layers 214, 216 and a non-magnetic anti-parallel coupling layer such as Ru 218 sandwiched between the magnetic layers 214, 216. The first magnetic layer 214 can be exchange coupled with a layer of anti-ferromagnetic material such as IrMn 220. This exchange coupling strongly pins the magnetization of the first magnetic layer 214 in a first direction perpendicular to the media facing surface (into or out of the plane of the page in FIG. 2). The anti-parallel coupling between the first and second magnetic layers 214, 216 pins the magnetization of the second layer 216 in a second direction that is opposite to the first direction.

The free layer 210 has a magnetization that is biased in a direction that is generally parallel with the media facing surface (to the left or right in FIG. 2). Although the magnetization of the free layer is biased in a direction parallel with the media facing surface, it is free to move in response to an external magnetic field, such as from a magnetic media. A capping layer 222 may be provided at the top of the sensor stack 202 to protect the underlying layers during manufacture.

The electrical resistance through the non-magnetic layer 212 varies depending upon the relative magnetizations of the free layer structure 210 and pinned magnetic layer 216, based on the electron spin dependent tunneling (in the case of a TMR sensor) or electron spin dependent scattering (in the case of a GMR sensor) of electrons traveling through the layer 212. This change in electrical resistance can be used to detect a magnetic field such as from a magnetic media in order to read a magnetic signal there-from.

Biasing of the magnetization of the free layer 210 can be provided by a magnetic bias field from a combination of a magnetic biasing structure 224 of the upper shield 206 and from soft magnetic side shields 226. The soft magnetic side shields 226 can be separated from the sides of the sensor stack 202 and from the bottom shield 204 by an electrically insulating, non-magnetic side gap layer 228, which can be constructed of a material such as alumina. The bias structure 224 can include first and second magnetic layers 230, 232 that are anti-parallel coupled across a non-magnetic anti-parallel coupling layer 234. The upper magnetic layer 232 can be exchange coupled with a layer of antiferromagnetic material such as IrMn 236. This exchange coupling pins the magnetization of the upper magnetic layer 232 in a first direction parallel with the media facing surface as indicated by arrow 238, and the anti-parallel coupling pins the magnetization of layer 230 in an opposite direction parallel with the media facing surface as indicated by arrow 240. The first and second soft magnetic side shields 226 are magnetically connected with the magnetic layer 230, and so have a magnetization that is set in the same direction as the magnetic layer 230 as indicated by arrows 242.

As demand for data density increases, the demand for greater track pitch has increased accordingly. This demand for increased track pitch has even reached the point where the effective width of a data track is smaller than the physical sensor width. One way to achieve this very high track pitch is through the use of two dimensional magnetic recording. Such a system employs a magnetic recording head with multiple magnetoresistive elements, arranged in such a manner that the magnetoresistive elements read different tracks of data simultaneously.

Figure 3:
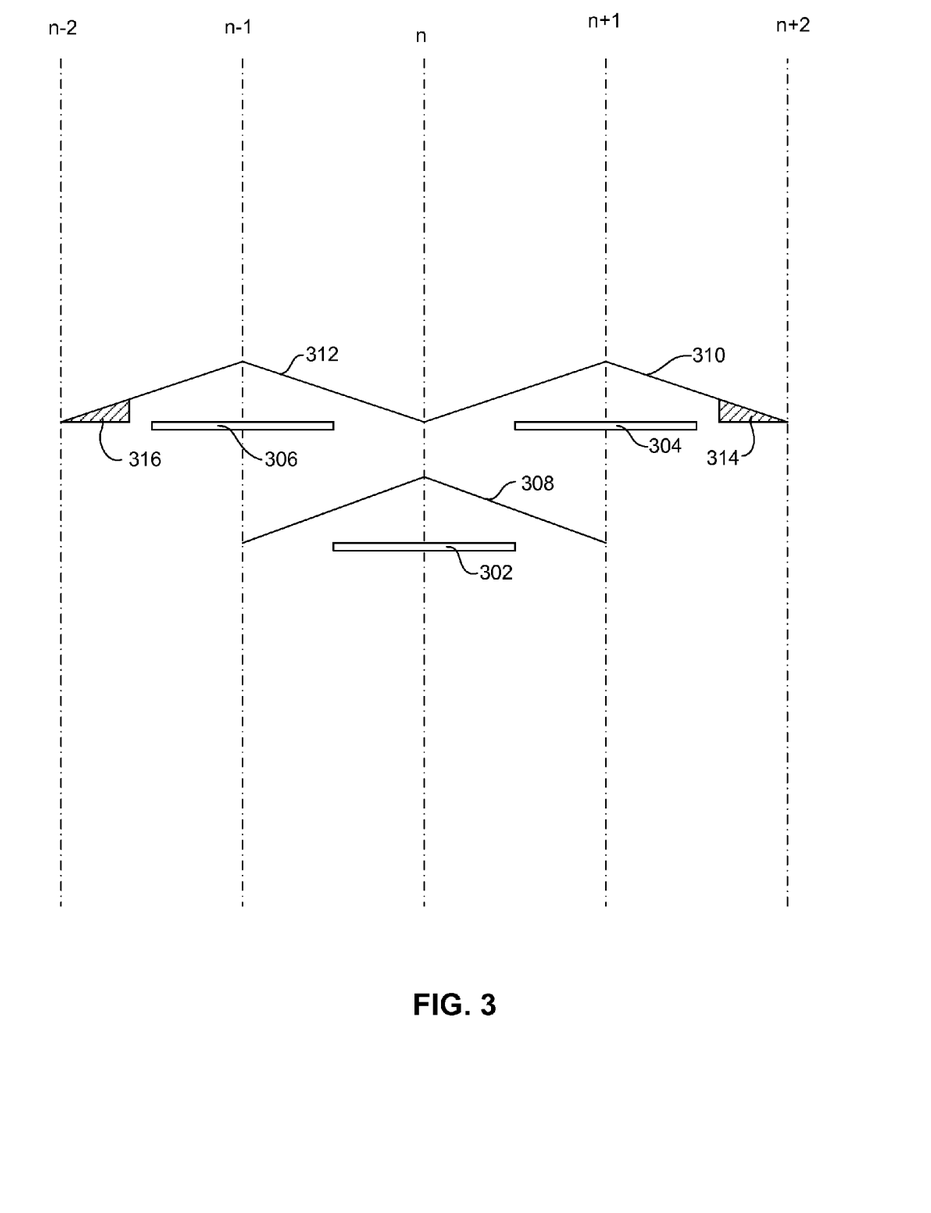
FIG. 3 is a schematic illustration of a magnetic read profile of a magnetic read head having a primary read sensor and 2 secondary read sensors, wherein the secondary read sensors have symmetrical read profiles.

Such a system is illustrated with reference to FIG. 3, which shows a schematic illustration of multiple magnetoresistive elements reading different tracks of data on a magnetic media. FIG. 3 shows a primary read element 302, located over a desired data track "n" from which data is to be read. Secondary magnetic elements 304, 306 are located at either side of the primary read element 302 and over adjacent data tracks n+1, n−1. Line 308 indicates the cross track amplitude profile of the primary sensor 302. Similarly, lines 310, 312 indicate the cross track amplitude profiles for secondary sensors 304, 306. As can be seen, the amplitude profile 308 of the primary sensor 302 extends beyond the desired track n and into adjacent tracks n+1, n−1. This leads to signal noise, making the reading of only the desired track n, difficult to impossible.

However, because the secondary read elements 304, 306 are located over the adjacent tracks 304, 306, these sensors can detect the signal of these data tracks. These signals from the data tracks n+1, n−1 can be subtracted out of the signal read by the primary sensor 302, thereby eliminating these adjacent track signals from the combined data signal. This, therefore, allows for greatly increased track pitch and data density.

However, as can be seen in FIG. 3, cross track amplitude signals 310, 312 of the secondary readers 304, 306 also extend into further adjacent tracks n+2, n−2, as indicated by the shaded areas 314, 316. This means that in addition reading a signal from the immediately adjacent track n+1, n−1, the secondary read element 304, 306 will read a signal from a further adjacent track n+2, n−2. When subtracted out from the signal from element 302, this will result in undesired signal noise, which becomes larger with increasing track pitch.

Figure 4:
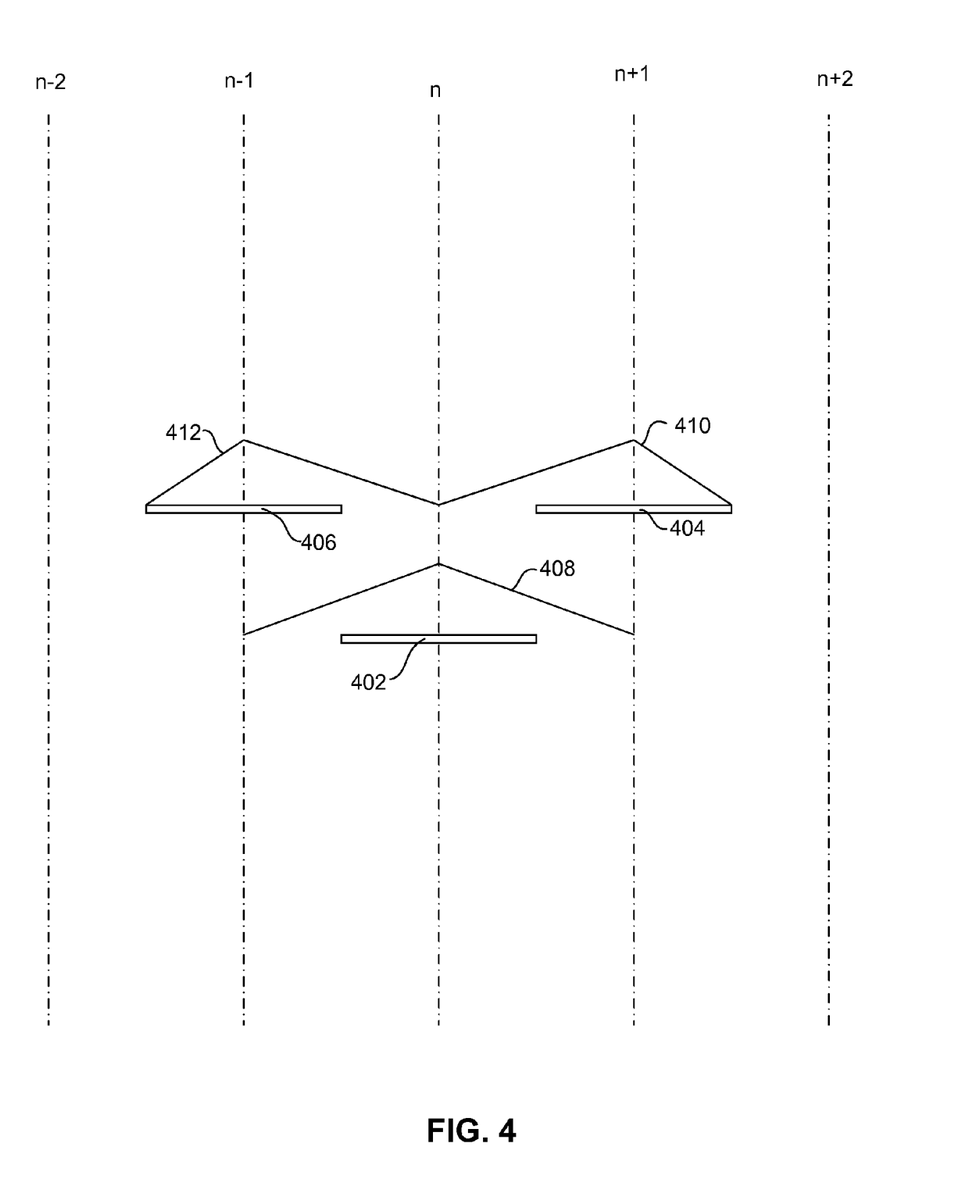
FIG. 4 is a schematic illustration of a magnetic read profile of a magnetic read head having a primary read sensor and 2 secondary read sensors, wherein the secondary read sensors have asymmetrical read profiles.

FIG. 4, illustrates a magnetic read head according to a system that overcomes the above described problem. As shown in FIG. 4, a magnetic recording head includes a primary magnetic read element 402 and first and second secondary magnetic read elements 404, 406. As before, the primary read element 402 is positioned over a desired data track to be read "n", whereas the secondary read elements 404, 406 are offset on an off-track direction, preferably over the immediately adjacent data tracks n+1, n−1. Line 408 indicates the off-track amplitude profile for the primary read element, and lines 410, 412 indicate the off-track amplitude profiles for the secondary read elements 404, 406.

As can be seen in FIG. 4, the cross-track amplitude profiles 410, 412 for each of the secondary read elements 404, 408 is asymmetrical. The outer side (the side furthest from data track "n" and furthest from the primary read element 402) of each amplitude profile 410, 412 is steeper than the inner side of the amplitude profile 410, 412. This advantageously prevents the amplitude profiles of the secondary read elements 410, 412 from extending to the further removed data tracks n+2, n−2 and, therefore, prevents the secondary read elements from picking up undesirable signal noise from these further removed data tracks n+2, n−2. While the steeper outer profile prevents the secondary read elements from picking up signal noise from further tracks n+2, n−2, the wider inner profile allows the secondary read elements 404, 406 to pick up sufficient signal from the tracks n+1, n−1 to allow signal noise from those tracks to be effectively subtracted out from the signal from the primary read element 402.

Figure 5:
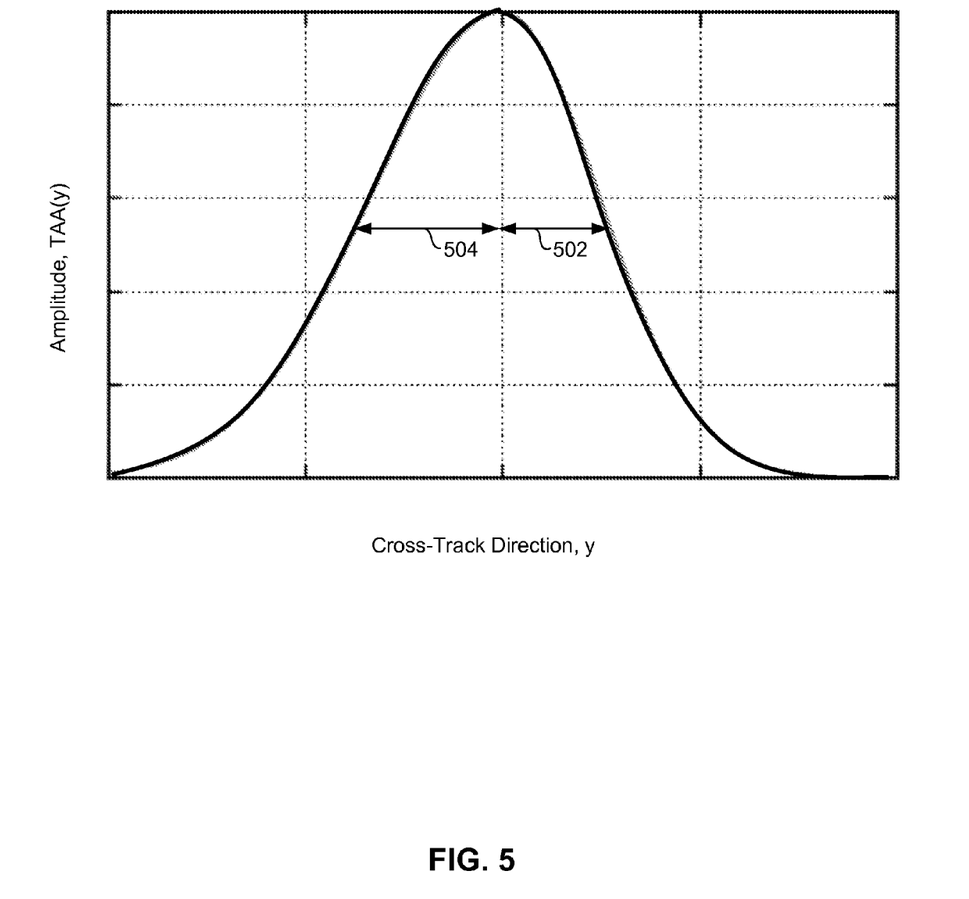
FIG. 5 is a graph illustrating signal amplitude as a function of cross track position for an asymmetrical read element.

FIG. 5 shows the cross track amplitude profile of an asymmetrical read sensor. The x axis represents the cross track location, and the y axis represents the signal amplitude. As can be seen, the distance from track center at one side of the track center is indicated by line 502, whereas the distance at the other side is indicated by line 504. As can be seen, line 502 is significantly shorter than line 504.

The cross track sensitivity of such a read element can be assumed to be asymmetrical Gaussian indicated by the function: $f(y)=A \cdot \exp(-B_{left}(y-C)^2)+D$, if $y-C \leq 0$ and $f(y)=A \cdot \exp(-B_{right}(y-C)^2)+D$, if $y-C \geq 0$. The magnetic read width asymmetry of the read can be defined as: $uMRW_{asym}$=the absolute value of $(uMRW50_{left}-uMRW50_{right})/(uMRW50_{left}+uMRW50_{right})$, where $uMRW50_{left/right}$=the square root of $(\log 2/B_{left/right})$. The asymmetry of the cross-track amplitude profiles of the secondary read elements 404, 406 is preferably 5% to 25%.

Figure 6:
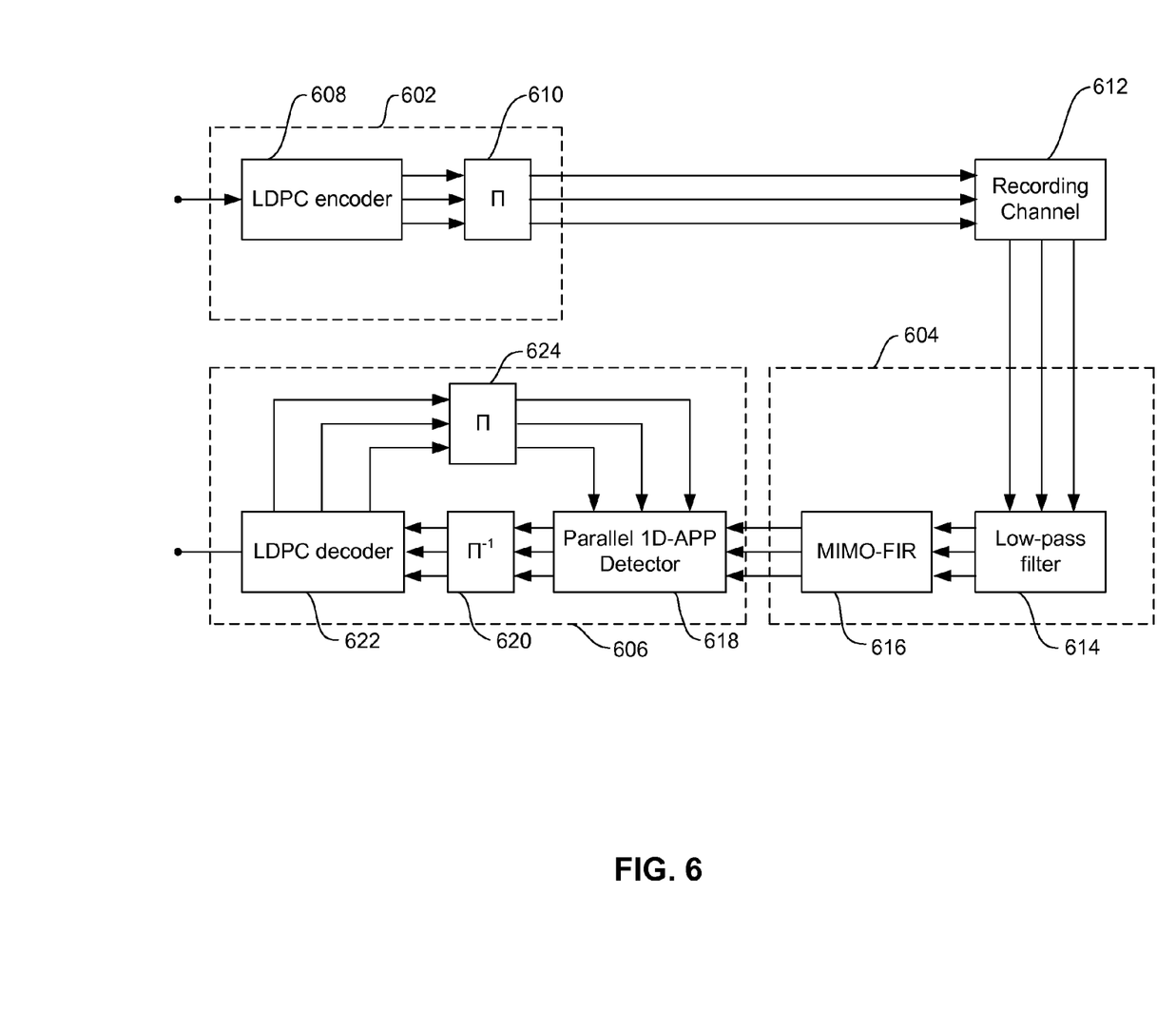
FIG. 6 is a schematic illustration of channel circuitry for decoding signals from primary and secondary read elements in a two dimensional magnetic recording system.

FIG. 6 shows a schematic illustration of circuitry for writing and reading data from a magnetic media in a two dimensional magnetic data recording system. The circuitry includes a module 602 for receiving user data, a magnetic recording channel 612, a module 604 for processing equalized data, and a module 606 for processing recovered data. The module 602 includes a Low-Density Parity-Check (LDPC) encoder 608 into which user data is input. The encoded data then passes from the LDPC encoder to a cross-track interleaver Π 610 in which the encoded data of each track interleaves along cross-track.

Data from the module 602 then passes to the magnetic recording channel 612 in which the data is recorded by the write head on the magnetic media and recovered by the read head from the magnetic media. The recovered data can then be passed to a low-pass filter 614, and then to a MIMO-FIR 616 for processing equalized data to a partial response target.

The equalized data then passes to module 606. Module 606 is a LDPC iterative decoder that includes a parallel 1D-APP detector 618. The 1D-APP detector 618 is preferably a posteriori probability (APP) detector based on a BCJR algorithm. The parallel 1D-APP detector 618 outputs log-likelihood ratio (LLR) of the data of each track. The LLR data then passes to a cross-track de-interleaver $\Pi^{-1}$ 620 which performs the inverse mapping of the cross-track interleaver 610. The de-interleaved LLR data then passes through a LDPC decoder 622 that can be based on a sum-product algorithm. An extrinsic information of the data output from the LDPC decoder 622 passes to the cross-track interleaver Π 624, and the interleaved extrinsic information is then fed back to the parallel 1D-APP detector 618 for the iterative decoding. After a desired number of iterations, the hard decision of the LLR data output from the LDPC decoder 622 gives the recovered user data.

Figure 7:
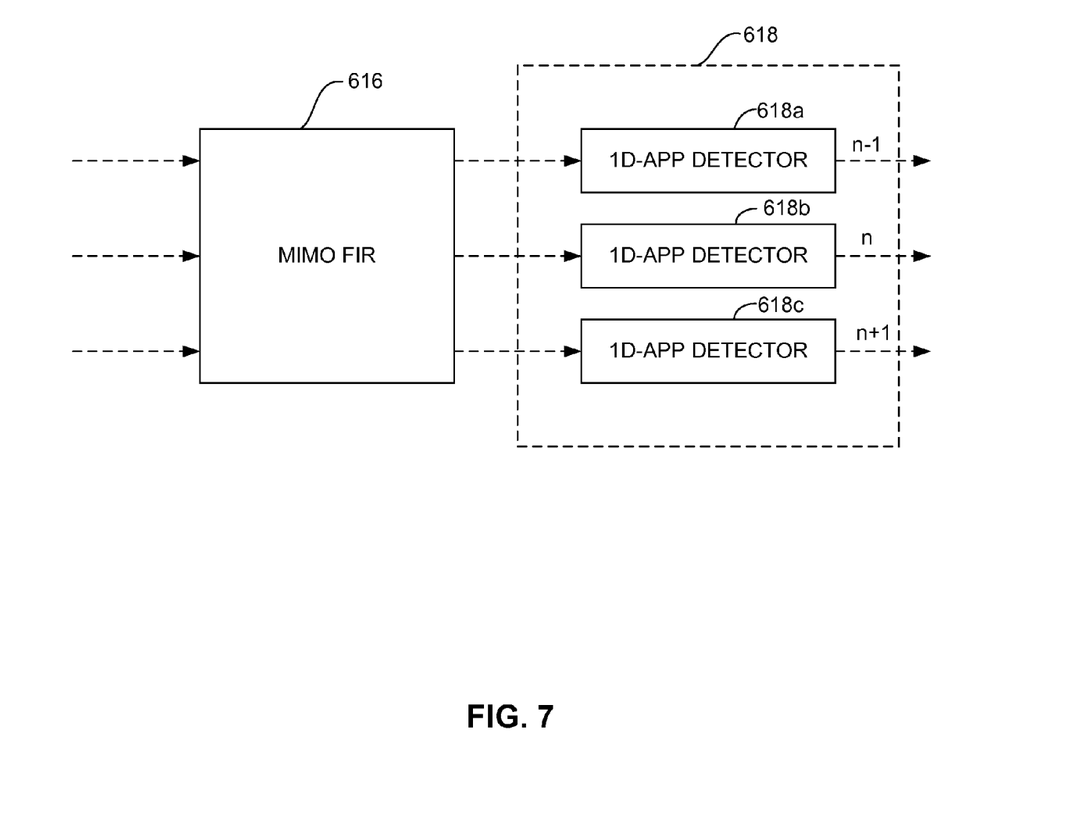
FIG. 7 is a schematic illustration of MIMO detection circuitry.
Figure 8:
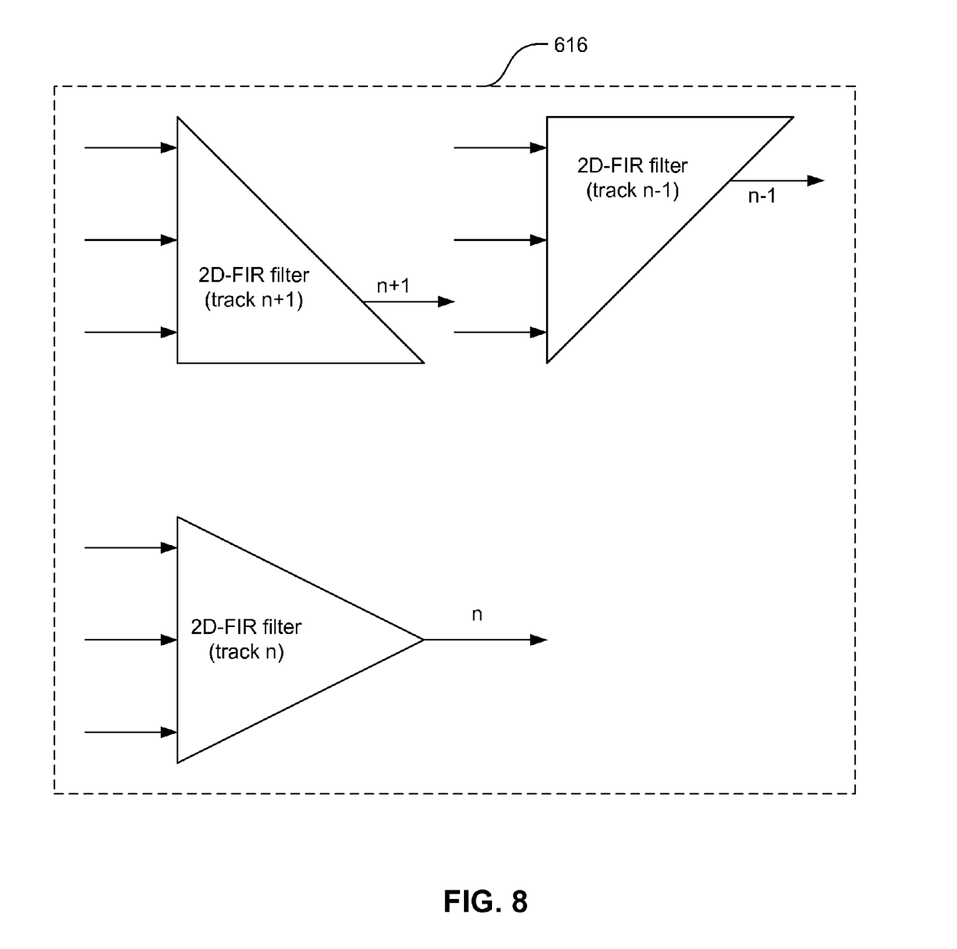
FIG. 8 is a schematic illustration of MIMO FIR filter circuitry.

FIGS. 7 and 8 show MIMO Filter 616 and parallel 1D-APP detector in greater detail. In FIG. 7 it can be seen that the parallel 1D-APP detector 618 actually includes multiple 1D-APP detectors 618a, 618b, 618c, with one for each data track n−1, n, n+1. In FIG. 8 it can be seen that the MIMO FIR includes multiple 2D-FIR filters, one for each track n−1, n, n+1.

Figure 9:
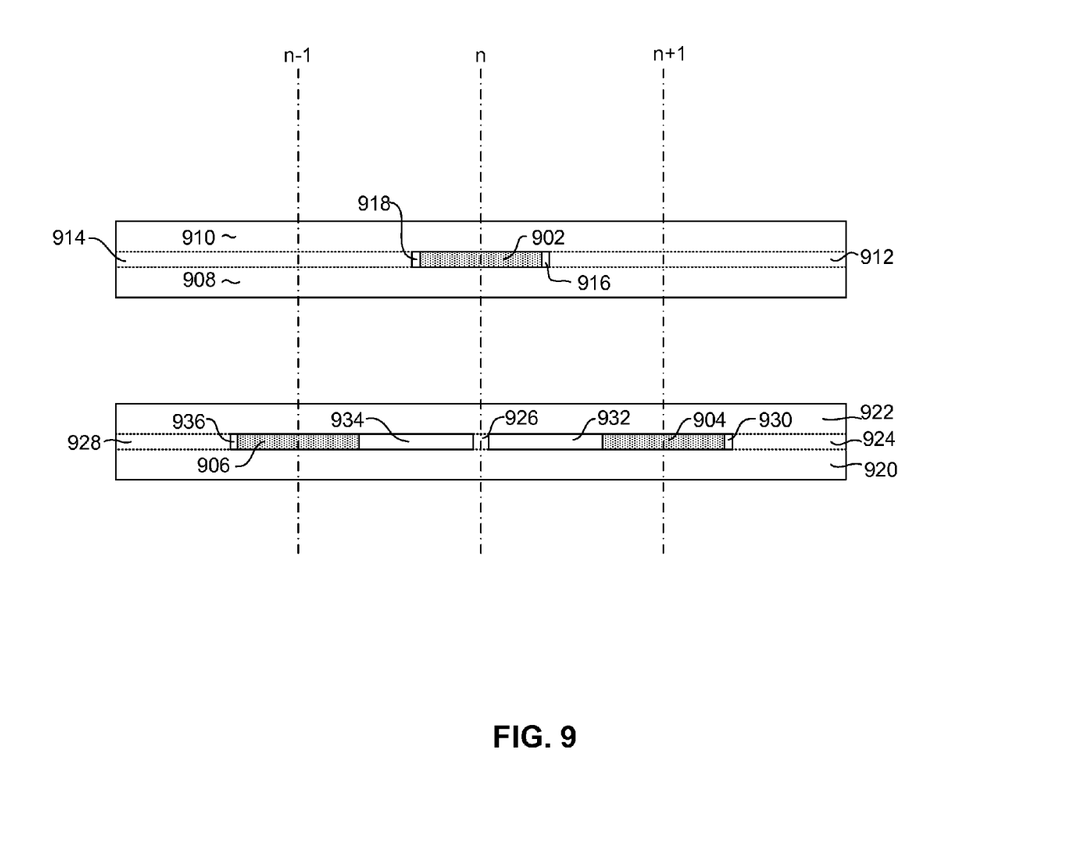
FIG. 9 is a schematic view of a magnetic read head embodiment for providing asymmetrical secondary read sensor profiles.

FIG. 9 illustrates one possible embodiment for providing secondary read elements with asymmetrical off-track amplitude profiles. FIG. 9 shows a magnetic head having a primary read element 902 that is located over a read track n, and secondary read elements 904, 906 that are laterally offset from the read track n and may be located over adjacent tracks n+1, n−1. The primary read element 902 is located between a leading magnetic shield 908 and a trailing magnetic shield 910. The primary read element 902 is also located between first and second side shields 912, 914. The side shields 912, 914 are separated from the sides of the primary read element 902 by first and second, non-magnetic, electrically insulating side gap layers 916, 918. It can be seen in FIG. 9 that these side gap layers 916, 918 have substantially the same width as one another.

With continued reference to FIG. 9, each of the secondary magnetic read elements 904, 906 is also located between a leading magnetic shield 920 and a trailing magnetic shield 922. Each of the secondary magnetic read elements 904, 906 is also located between side magnetic shields 924, 926, 928. The magnetic shield 926 can be located between the read element 904, 906 so that it can function as a side shield for both of the secondary read elements 904, 906. The side shields 924, 926, 928, 912, 914 can be integral with or separate structures from the leading and trailing magnetic shields 920, 922, 908, 910, and thus the line between the side shields and trailing and leading shields is shown in dotted line in FIG. 9.

The read element 904 is separated from the side shield 924 by a side gap layer 930, and is separated from the side shield 926 by a side gap layer 932. As can be seen, the side gap layers 930, 932 are have different widths so that the side gap layer 932 is much wider than the side gap layer 930. Similarly, the read element 906 is separated from the side shield 926 and side shield 928 by non-magnetic side gap layers 934, 936, with the side gap layer 934 being much wider than the side gap layer 936. Because the side gap layers 930 and 932 (for element 904) and 934, 936 (for element 906) have different widths, the cross track amplitude profiles will be asymmetrical as discussed above. The close proximity of the side shield 924 to element 904 and relatively greater distance of the shield 926 from the element 904 will cause the read element 904 to have a sharp amplitude profile at the right side and a wide profile at the left side. Similarly, the asymmetrical side gaps 934, 936 of read element 906 will cause read element 906 to have a sharp amplitude profile at its left side and a wide amplitude profile at its right side.

Thus, the embodiment described with reference to FIG. 9 provides just one example of a structure for providing secondary magnetic read elements with asymmetrical off track amplitude profiles. Other, structures and embodiment are also possible for providing such an asymmetrical off track amplitude profile, such as those having other asymmetrical side shield structures. For example, a side shield structure could be provided wherein each of the secondary read elements 904, 906 has a side shield at one side that is of a different material than a side shield at the other side. For example, the side shield at the outer side could have a higher magnetic permeability than the side shield at the other side.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic read head, comprising:
a primary read element; and
at least one secondary read element, the secondary read element having an asymmetrical cross track amplitude profile;
wherein the secondary read element is located in an off track location, and wherein the asymmetrical read profile includes a steep profile at an outer side away from the primary read element and a relatively wider read profile at an inner side toward the primary read element.

2. The magnetic read head as in claim 1 further comprising first and second secondary read elements, each of which has an asymmetrical cross track amplitude profile.

3. The magnetic read head as in claim 2 wherein each of the first and second secondary read elements has an asymmetrical side shield structure.

4. The magnetic read head as in claim 1, wherein the secondary read element is located in an off track location.

5. The magnetic read head as in claim 1 including first and second secondary read elements located at off track locations at opposite sides of the primary read element and wherein each of the first and second read elements has an inner side that faces the other secondary read element and an opposite outer side, and wherein each of the first and second read elements has a narrow, steep off-track amplitude profile at its outer side and a shallow, wide amplitude profile at its inner side.

6. The magnetic read head as in claim 5 wherein each of the first and second magnetic read elements has an outer side located away from the other secondary read element and an inner side located toward the other secondary read element, the magnetic read head further comprising magnetic side shields located at either side of each of the first and second secondary read elements, the magnetic side shields being separated from the first and second secondary read elements by nonmagnetic gap layers and arranged such that each of the magnetic read elements has a smaller non-magnetic side gap at its outer side than it does at its inner side.

7. The magnetic read head as in claim 1 further comprising a first magnetic side shield separated from a first side of each secondary read element by a first non-magnetic side gap layer, and a second magnetic side shield separated from a second side of each secondary read element by a second non-magnetic side gap layer, and wherein the first side gap layer is narrower than the second side gap layer.

8. The magnetic read head as in claim 7 wherein the first side of the secondary read element is located away from the primary read element and the second side of the secondary read element is located toward the primary read element.

9. The magnetic read head as in claim 1 wherein the secondary magnetic read element is laterally offset from the primary read element by a distance that is substantially equal to one track spacing.

10. The magnetic read head as in claim 1, wherein each of the first and second magnetic read elements is laterally offset from the primary read element by a distance that is substantially equal to one track spacing.

11. A magnetic data recording system, comprising:
a housing;
a magnetic media mounted within the housing and having a plurality of data tracks defined thereon;
an actuator mounted within the housing
a slider connected with the actuator; and
a magnetic read head formed on the slider, the magnetic read head comprising:
a primary read element; and
first and second secondary read elements, each of the first and second secondary read elements having an asymmetrical cross track amplitude profile; wherein:
the primary read element is configured to read a first data track and the first and second secondary read elements are configured to read second and third data tracks that are adjacent to and at opposite sides of the first data track; and
each of the first and second secondary read elements has an off track amplitude profile that is steeper at its outer side and broader at its inner side.

12. The magnetic data recording system as in claim 11, wherein primary read element is configured to read a first data track and the secondary read element is laterally offset from the primary data track so as to be located over a second data track that is adjacent to the first data track.

13. The magnetic data recording system as in claim 11, further comprising circuitry for reading signals from the first second and third data track and to subtract out the signals of the second and third data tracks in order to reduce adjacent track signal noise from the signal of the first data track.

14. The magnetic data recording system as in claim 11, further comprising magnetic side shield structures separated from each of the secondary magnetic read elements by non-magnetic side gap structures configured that each magnetic read element has a wider side gap structure at one side and a narrower side gap structure at the other side.

15. The magnetic data recording system as in claim 11, further comprising magnetic side shield structures separated from each of the secondary magnetic read elements by non-magnetic side gap structures configured such that each magnetic read element has a wider side gap structure at an inner side and a narrower side gap structure at an outer side.

16. The magnetic data recording system as in claim 11, wherein each of the first and second secondary read elements has an asymmetrical side shield structure.

17. The magnetic data recording system as in claim 11, wherein each of the first and second secondary read elements has a side shield structure with a side shield at one side being of a different material than a side shield at the other side.

* * * * *